Sept. 18, 1956     T. E. GODDEN ET AL     2,763,279
FLUID FLOW CONTROL DEVICES
Filed Nov. 16, 1951     4 Sheets-Sheet 1
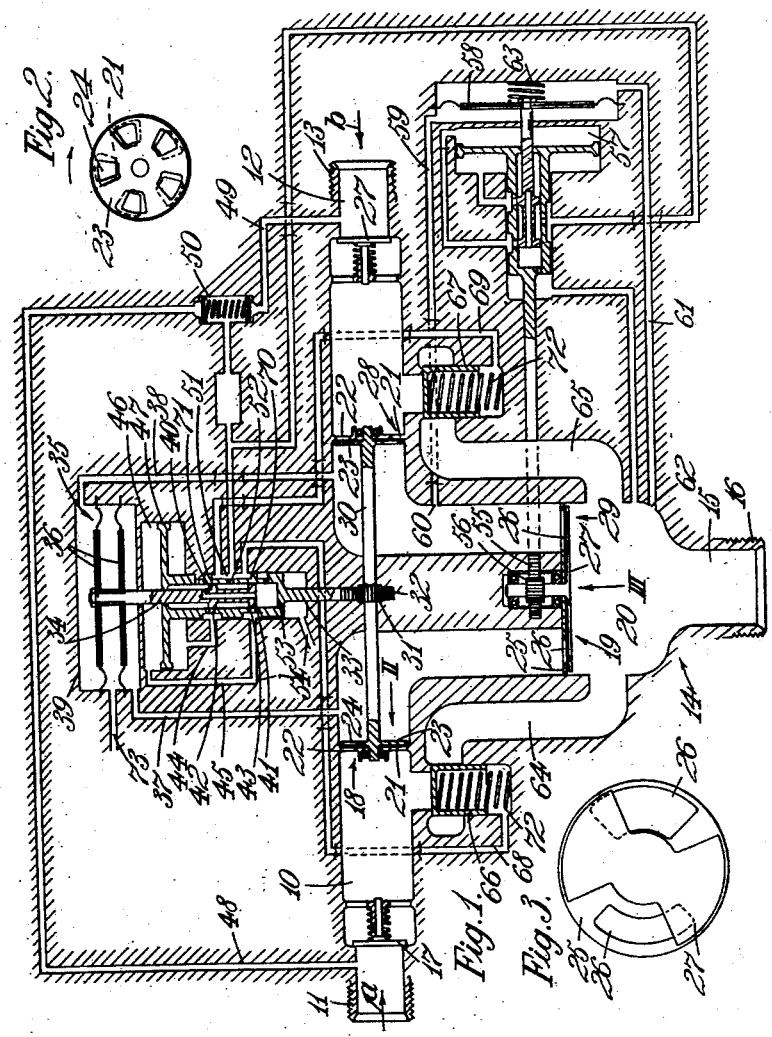
INVENTORS
T. E. GODDEN &
E. H. MORRIS &
A. H. W. LOYNES
By Wilkinson & Mawhinney
ATTORNEYS.

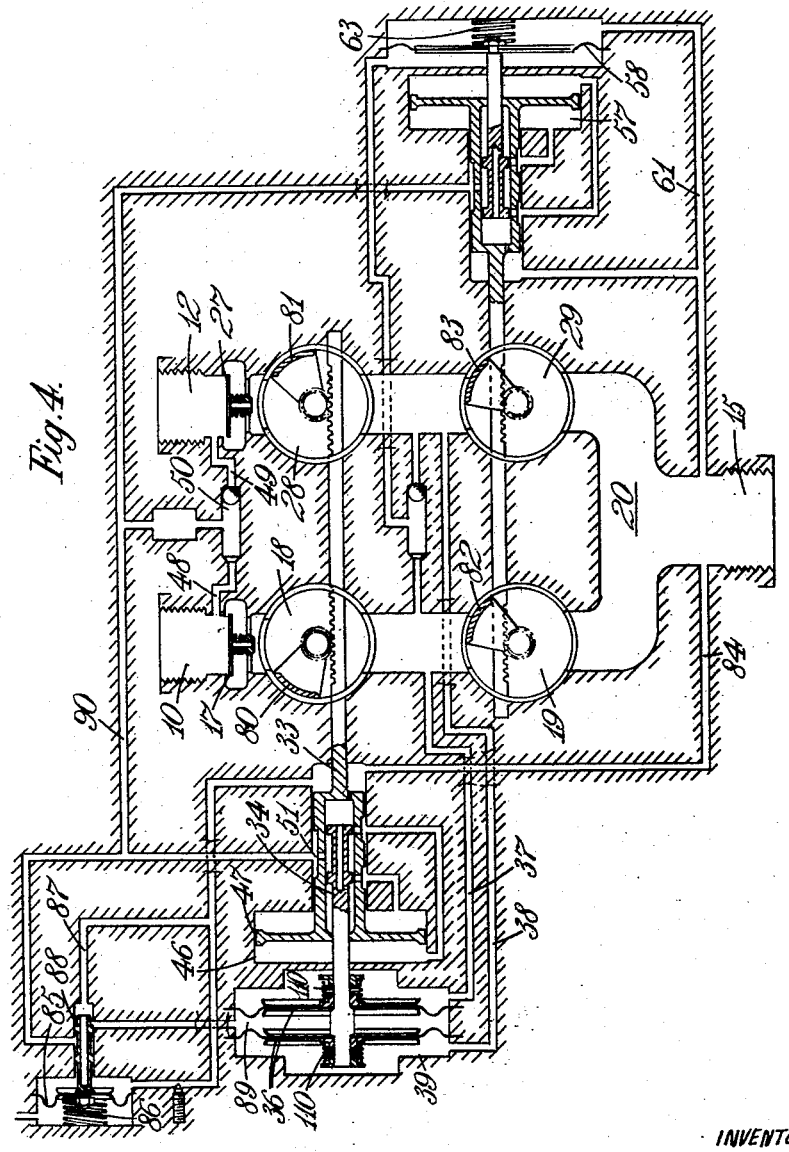

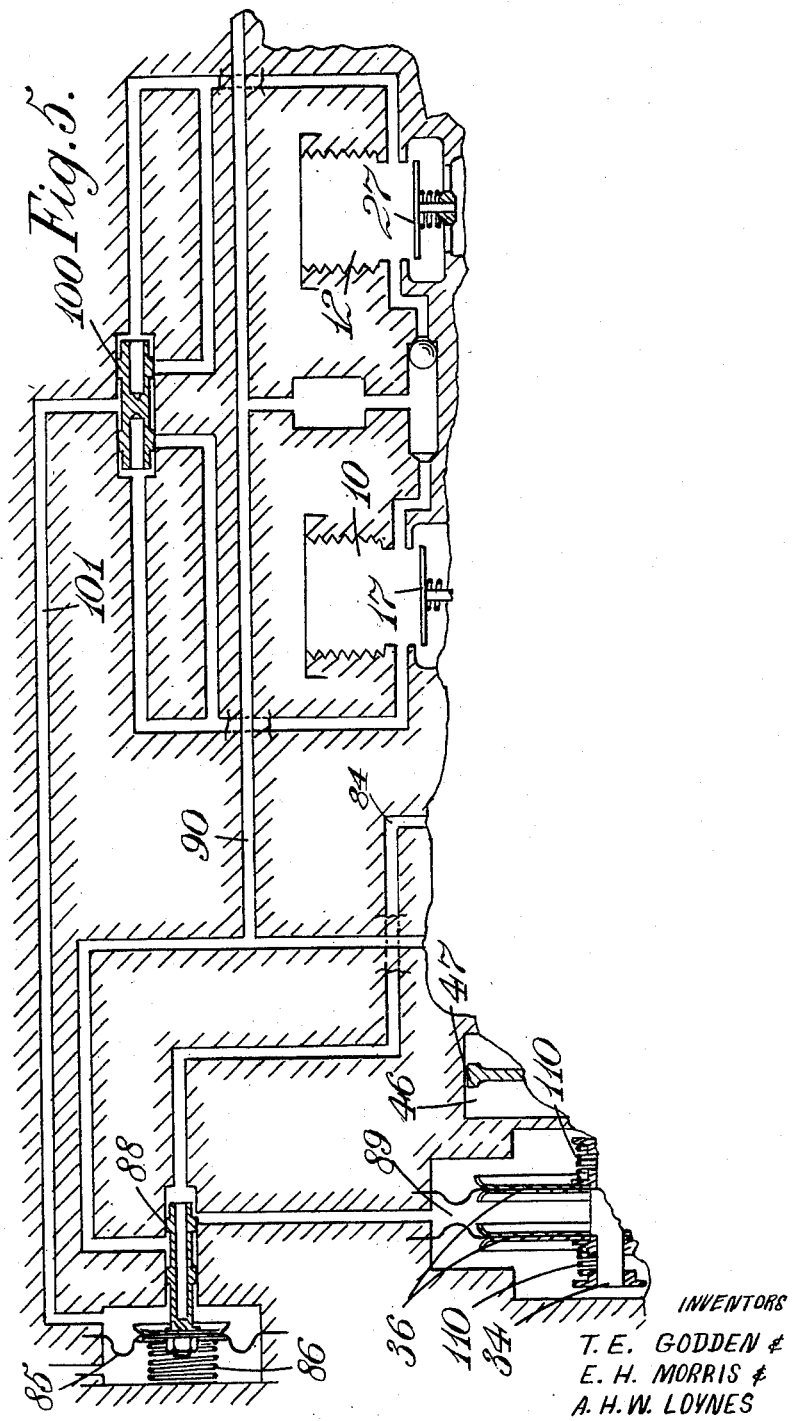

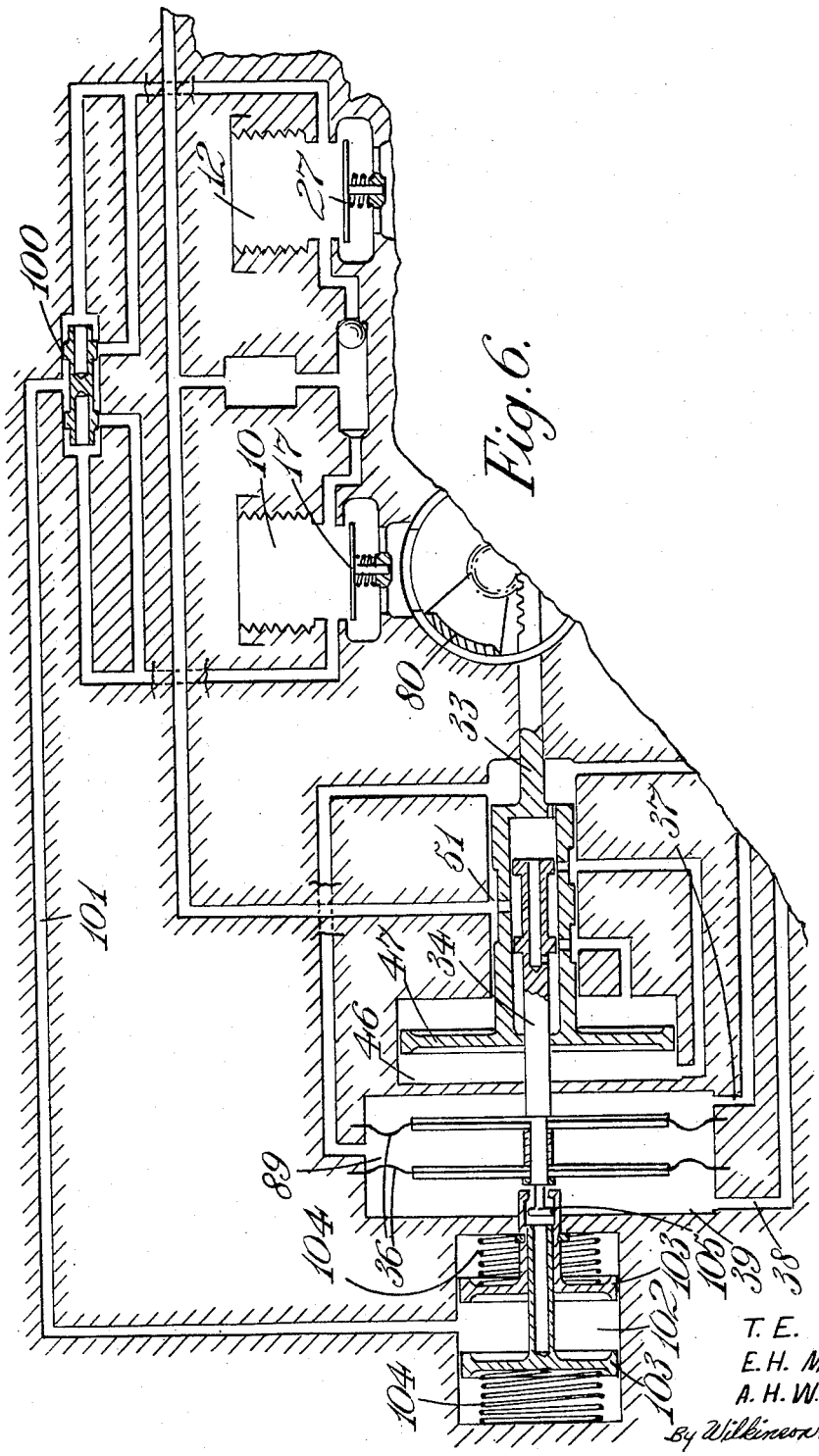

United States Patent Office 2,763,279
Patented Sept. 18, 1956

2,763,279

FLUID FLOW CONTROL DEVICES

Thomas Edward Godden, Edward Hollingworth Morris, and Alfred Herbert Walter Loynes, Gloucester, England, assignors to Rotol Limited, Gloucester, England, a British company Application November 16, 1951, Serial No. 256,684

Claims priority, application Great Britain December 22, 1950

19 Claims. (Cl. 137—99)

This invention relates to devices for maintaining a predetermined flow relationship between two or more fluid streams of variable mass flow. Such a device is particularly useful in aircraft in which an engine is supplied with fuel from two or more tanks. By drawing fuel simultaneously from each tank in proportion to its capacity the pilot is relieved of the necessity for switching over from one tank to another at the appropriate time, and it can also or alternatively be arranged that the trim of the aircraft is not disturbed by the consumption of fuel. The device is also applicable in cases in which similar or different liquids or gases have to be mixed in predetermined proportions.

The principal object of the invention is to provide such a device which is operated solely by the pressure of the fluid supplied to it and which will provide approximately the same accuracy of control throughout a large range of mass flows, while causing only a small loss of delivery pressure.

Another object of the invention is to make provision for the maintenance of supply from at least one of the streams should the other or others fail completely.

The device according to the invention comprises a conduit for each stream containing a pressure-regulating device and downstream thereof a variable constriction, means for controlling said pressure-regulating devices to maintain equal pressures on their downstream sides, and means for varying said constrictions (a) so that a constant pressure drop is maintained across them for varying mass flows and (b) so that for given equal pressures on their upstream sides the flows past them bear the required predetermined relation to one another.

According to a feature of the invention the pressure-regulating devices comprise valve members each operated by a servomotor utilizing as working medium fluid drawn from upstream of the valve members from whichever stream for the time being has the higher pressure, the servomotor pertaining to each valve member being controlled by movements of a member responsive to difference of pressures on the downstream sides of said valve members in the sense to operate its valve to equalize such pressures.

In the case of a device according to the invention for maintaining a predetermined flow relationship between two fluid streams the pressure-regulating valve members may conveniently be operated by a common servomotor and arranged so that as one opens the other closes and vice versa, or alternatively the arrangement may be such that either valve member may close or re-open while the other remains in its fully open state.

For use in cases in which one particular fluid stream is supplied always at a pressure lower than that of the other stream or streams the device according to the invention may be modified to omit the pressure-regulating device for the lower or lowest pressure stream, the pressure of this stream being used as a datum pressure to which the pressure of the other streams are adjusted by their respective pressure-regulating devices.

According to a further feature of the invention the variable constrictions are each constituted by an orifice in a plate-like member associated with a movable shutter for varying the area of the free opening.

Preferably all the said shutters are rigidly connected and operated by the pressure of the fluid being controlled, the shape and dimensions of the orifices being so determined in relation to the movements of the shutters as to maintain the areas of the orifices in the same relation as that required between the fluid streams. Since the pressures on the upstream sides of the orifices are equal it will be understood that the flows are proportional to the areas of the orifices, apart from small variations due to different discharge coefficients, for which an adjustment may be made if necessary.

In a preferred arrangement the shutters are operated by a common servomotor utilizing as working medium fluid drawn from upstream of the pressure-regulating devices from whichever stream for the time being has the higher pressure, the servomotor being controlled by movements of a member responsive to the difference between the pressure upstream of the orifices and the sum of the pressure downstream of the orifices and another substantially constant pressure, produced for example by a spring.

To permit supply to be continued from one or more of the fluid streams should another or others fail, the device according to the invention may include means operative to by-pass any of the conduits from between its pressure-regulating device and a non-return valve upstream thereof to downstream of said pressure-regulating device or to downstream of the following variable constriction on attainment of (a) a predetermined rise of pressure upstream of said pressure-regulating device and/or (b) a predetermined fall of pressure in another of the conduits upstream of its pressure-regulating device.

Instead of having a separate by-pass passage each pressure-regulating device may comprise a valve member which in part of its range of movement effects increasing restriction of flow and thereafter allows increasing flow, a non-return valve still being provided upstream of each pressure-regulating device as stated in the preceding paragraph.

Practical constructions of the invention will now be described with reference to the accompanying drawings whereof:

Figure 1 is a diagrammatic sectional view of one construction of device in accordance with the present invention, Figures 2 and 3 are views respectively in the direction of the arrows II and III of Figure 1, Figure 4 is a view corresponding to Figure 1 and showing an alternative construction of device in accordance with the present invention, Figure 5 is a diagrammatic sectional view showing certain modifications in construction of the device of Figure 4 and Figure 6 is a diagrammatic sectional view showing details of further modifications applicable to the construction of Figure 4.

The drawings illustrate devices for maintaining a predetermined flow relationship between two streams of liquid fuel each of which is supplied from a tank, the two streams being supplied along a common conduit to an engine e. g. for use in aircraft.

One fuel stream passes along a conduit 10 which is connected, as at 11, to a pipe leading to a fuel tank while the other fuel stream passes along a conduit 12 which is connected, at 13, to a pipe leading to another fuel tank. The conduits 10 and 12 are formed within a body generally indicated by the reference numeral 14, the conduits leading to a common outlet 15 which is connected, as at 16, to the engine. Considering first of all the conduit 10: there is provided therein, proceeding in the direction of fluid flow (indicated by the arrow a) a non-return valve 17, a pressure-regulating valve 18 and a variable constriction 19. The two streams join one another on the downstream side of the variable constriction, at 20, and leave the device by the common outlet 15.

The pressure-regulating valve 18 comprises a stationary disc 21 extending across the conduit 10 and formed with ports 22, and a rotating disc 23 formed with ports 24 (Figure 2).

The variable constriction comprises a fixed disc 25 having an orifice 26 associated with the conduit 10 and a moving shutter 27 (Figure 3).

A similar arrangement of non-return valve 27, pressure-regulating valve 28 and variable constriction 29 is associated with the conduit 12 and it is to be noted from Figure 1 that the variable constrictions 19, 29 are constituted by a common disc 25 and a common shutter 27. Like numerals are used to indicate like parts for the valves 18, 28 and constrictions 19, 29.

The two rotating discs 23 are mounted on a common shaft 30, the arrangement of the ports being such that as those of the valve 18 open those of the valve 28 close. The shaft 30 carries a pinion 31 meshing with a rack 32 forming part of the piston rod 33 of a servomotor of the cylinder and piston type.

Part of the piston rod 33 has a cylindrical bore housing a pilot valve 34 arranged for reciprocation therein by a diaphragm assembly 35, the opposite sides of the diaphragms 36 of said assembly being subject to fluid pressure transmitted along the passages 37, 38 leading respectively from the conduits 10, 12 (from between the valves 18, 28 and the variable constrictions 19, 29) to a chamber 39. The pilot valve 34 comprises two axially spaced lands 40, 41 which normally close ports 42, 43 respectively in the piston rod 33. The ports 42, 43 connect by passages 44, 45 respectively to the opposite ends of the cylinder 46 of said servo motor within which there is mounted the servo piston 47 carrying the piston rod 33. From each of the conduits 10, 12 and upstream of the non-return valve 17 there is a branch passage 48, 49 leading by way of a non-return valve 50 into a chamber 51 from which a further passage leads through a port 52 in the piston rod 33 into the space between the lands 40, 41.

With the arrangement described when the diaphragm assembly 35 is displaced by a difference of pressure downstream of the valves 18, 28 it moves the pilot valve 34 so that the lands 40, 41 uncover the ports 42, 43 respectively, one of said ports being opened to fluid at supply pressure in the space between the lands and the other being opened to drain through passages 53, 54 suitably provided in the piston rod 33 and body 14. The servo piston 47 is accordingly displaced by the pressure of the fluid and the arrangement is such that it follows up movements of the pilot valve 34 in a well known manner to close the ports 42, 43 and simultaneously operates the valves 18, 28 in the sense to equalize the pressures on their downstream sides.

The shutter 27 of the variable constrictions 19, 29 is operated through a rack 55 and a pinion 56 by a servomotor 57, the arrangement being similar to the servomotor arrangement described above with reference to the valves 18 and 28. The servomotor 57 is operated in response to movements of a diaphragm 58 which is subject on one side to pressure transmitted along a passage 59 from a port 60 in the conduit 12 between the disc valve 28 and the variable constriction 29 and on the other side to pressure transmitted along a passage 61 from a port 62 downstream of the variable constrictions 19, 29 and to the pressure of a spring 63, the arrangement being such as to maintain a constant pressure drop across the constrictions 19, 29 as determined by the pressure of spring 63.

The shutter 27 rotates about an axis normal to its plane and, as shown in Figure 3, the orifices 26 are at equal distances from this axis so that their width is in the same relation as the predetermined flow rates of the two streams. For example, if it is desired to draw fuel from the two tanks in proportion to the capacities the widths of the orifices 26 will be proportional to said capacities and the same relation will be maintained as the shutter closes the orifices. The closing of the orifices as the mass flow falls ensures that the same accuracy of control will be available for small as for large flows.

If the supply pressure of one of the streams (e. g. the stream in conduit 10) falls the disc valve 18 opens and the disc valve 28 closes. If therefore one of the streams fails completely the other stream will also be cut off. This would be undesirable in the case of a fuel supply system and passages 64, 65 each containing a valve 66, 67 respectively are accordingly provided to by-pass each of the valves 18, 28 and place the conduit 10 or 12 (upstream of the disc valves 18, 28) in communication with the downstream side either of the disc valves 18, 28 or of the variable constrictions 19, 29.

The by-pass valves 66, 67 may be spring-loaded pressure release valves which open under the rise of pressure produced when the disc valve closes or they may be maintained normally closed by pressure derived from the supply streams, provision being made to shut off such pressure when the associated disc valve closes—which may be effected by using the servo piston rod as the control valve member. The latter arrangement is shown in Figure 1 wherein the valves 66, 67 are connected respectively by passages 68, 69 with the chamber 51, the piston rod 38 being formed with lands 70, 71 which are arranged to close one or the other of the passages 68, 69 when the associated valve 18, 28 is closed. In an alternative arrangement the closing pressure for each by-pass valve 66, 67 may be derived from the opposite supply stream with which it is associated so that it opens if this stream fails.

In addition to fluid pressure for closing the valves 66, 67 there is provided a light spring 72 to assist in maintaining the by-pass valves closed.

The space between the diaphragm 36 is vented to atmosphere at 73.

It is evident from the drawing that the non-return valve 50 is such that the fluid stream at the higher pressure is delivered to the chamber 51 from conduit 10 or 12.

With the arrangement shown in Figure 1 if the fuel stream in conduit 12, for example, is supplied always at a lower (though possibly variable) pressure than that of the fuel stream in conduit 10, the pressure-regulating device incorporating valve 28 may be omitted, the pressure of the stream in conduit 12 being used as a datum of pressure and applied to the diaphragm assembly 35 for adjusting the pressure-regulating device incorporating valve 18 so that the latter is regulated to maintain the prevailing datum pressure is conduit 10.

As already pointed out with reference to Figure 1 failure of one of the supply streams results in the closing of the valve 18 or 28 of the other stream but if the valve 18, 28 is so constructed that before closing completely it starts to open again under continued movement of the servo piston it will be clear that the control sense is reversed so that the servo piston will continue to travel, owing to the build up in pressure difference, until stopped from doing so.

An alternative construction of device in accordance with the present invention is shown in Figure 4 in which like parts to those of Figure 1 bear like reference numerals. In this construction instead of using rotating-disc type valves for pressure-regulation and flow constriction, part cylindrical shutters rotating about the cylinder axis are used for both these purposes. As shown in Figure 4 the shutters 80, 81 are associated respectively with the pressure-regulating valves 18 and 28 and the part cylindrical shutters 82, 83 are associated with the variable constrictions 19 and 29 respectively. As in the construction described with reference to Figure 1 the shutters 80, 81 are operated by a servomotor 46, 47 of the cylinder and piston type and the shutters 82, 83 are operated by the servomotor 57, which is of the same type. The shutters 80, 81 are arranged so that when operated by the servomotor 46, 47 the one closes while the other remains open.

The arrangement of Figure 4 is directed to ensuring that failure of one of the supply streams does not result in closing of the pressure-regulating valve of the other stream and is characterised in that after a pressure-regulating valve has started to close, due to failure of the stream associated with the other valve, the closing movement is arrested and reversed in a manner which will now be described.

The outlet 15 is connected by a passage 84 to the free side of a spring loaded diaphragm 85 to provide a pressure which during normal operations is sufficient to compress the spring 86 and allow the pressure at the outlet 15 to be applied through passage 87 and a piston valve 88 to a space 89 between the pair of diaphragms 36.

In the event of failure of the supply of fuel to one of the conduits (for example to the conduit 12) the servomotor 46, 47 is brought into operation as described above to close the shutter 80 and open the shutter 81 in an attempt to equalize the pressures in the conduits 10 and 12. As a consequence the pressure in the outlet 15 will fall and such pressure reduction will be transmitted to the diaphragm 85 so that the spring 86 moves the valve 88 to the right in Figure 4 thereby admitting high pressure fluid from the conduit 10 by way of the non-return valve 50 and passage 90 to the space 89 so that the diaphragms 36 are moved apart. The movement of separation of the diaphragms 36 is limited by the walls of the chamber 39 and when the diaphragms engage the walls the piston valve 34 will have been adjusted to its central position whereby the servomotor 46, 47 is brought into operation to adjust the shutter 80 and open the valve 18 sufficiently to maintain the spring loaded diaphragm 85 and the piston valve 88 in a balanced position. It is arranged that the pressure at the outlet 15 is maintained at a value slightly below its normal minimum value.

Should the fuel supply to the conduit 12 be restored the consequent increase in pressure at the outlet 15 will be applied to the diaphragm 85 and the piston valve 88 will be adjusted to its normal position so that the pressure prevailing at the outlet is again applied to the space 89 whereby the device functions in normal manner to proportion the fuel in the manner described above.

Another mechanism for producing the control effect described with reference to Figure 4 is diagrammatically illustrated in Figure 5 from which it will be noted that the conduits 10 and 12 upstream of the non-return valves 17 and 27 are connected to a low-pressure selector valve 100 which allows the lower of the two inlet pressures to be applied through passage 101 to the free side of the spring loaded diaphragm 85 so that during normal operation the spring 86 is compressed and the piston valve 88 is set to permit the pressure at the outlet 15 to be applied by way of passage 84 to the space 89 between the diaphragms 36.

In the event of the fuel supply to one of the conduits failing (e. g. the supply to the conduit 12) the spring 86 adjusts valve 88 to allow high pressure fuel from the passage 90 to enter the space 89 and displace the diaphragms 36 with the results indicated above. Should the fuel supply be restored to the conduit 12 the device is brought back into normal operation to proportion the fuel as already described.

In the construction shown in Figures 4 and 5 the diaphragms 36 are returned by springs 110 to their normal operating condition on the release of the high inlet pressure from the space 89 between the diaphragms.

Another construction of mechanism for obtaining the control effect described with reference to Figure 4 is shown in Figure 6 from which it will be noted that the conduits 10 and 12 are connected to the low-pressure selector valve 100 and that the passage 101 places the valve in communication with a chamber 102 the arrangement being that the valve 100 ensures that the lower of the two inlet pressures is applied to the chamber 102 between a pair of pistons 103 to hold them apart against the action of springs 104. In the event of failure in the supply of fuel to one of the conduits 10 or 12 (e. g. conduit 12) the pressure prevailing in the conduit 12 (i. e. the lower pressure) is applied by way of valve 100 to the chamber 102 and the springs 104 will force the pistons 103 together to grip head 105 on the piston valve 34. The springs 104 will centralize the pistons 103 in the chamber 102 and by engagement with the head 105 will centralize the piston valve 34 so that the shutter 80 opens the conduit 10 and permits fuel to pass through the unit with the minimum restriction. Should the fuel supply to the conduit 12 be restored the resulting rise in pressure in the conduit 12 will be applied to the chamber 102 to force the pistons 103 apart against the action of the springs 104 whereby the piston valve 34 is released and the unit is brought into operation to proportion the fuel in the manner described above.

In the system described with reference to Figures 5 and 6 the mechanism for centralizing the piston valve 34 on failure of the supply of fuel to one of the conduits 10 or 12 is operated by the loss of pressure at the inlet to the conduit. It is therefore esential that there is no non-return valve between the inlet to each conduit 10, 12 and the tank which supplies it in order to ensure that leakage past the valve 100 does not build up a pressure in the inlet to the conduit of the failed supply. This means that only one fuel tank can be connected to each of the conduits 10 and 12. The construction of device described with reference to Figure 4 may be used where two or more tanks feed into each of the conduits 10 and 12 but is open to the disadvantage that when the group of tanks delivering to one of the conduits is being by-passed the pressure at the outlet 15 is maintained slightly below its normal minimum value.

We claim:

1. A device for maintaining a predetermined flow relationship between at least two fluid streams of variable mass flow in which one of the streams is at a pressure always less than the pressure of the other stream, comprising a conduit for each stream; a variable constriction in each conduit, said constrictions being variable together so that a constant ratio is always maintained between the effective areas of said constrictions corresponding to the desired flow relationship between said streams; pressure-regulating means including a pressure-regulating valve in the conduit of said other stream for regulating the fluid pressure on the upstream side of the constriction therein, the pressure fluid in said one stream being used as a datum for the adjustment of the pressure of fluid in said other stream, said pressure-regulating means being effective for maintaining the pressures on the upstream sides of said variable constrictions substantially equal to one another in all said conduits; a first control means responsive to variations in the difference of pressure between the variable constriction in said other stream and said pressure-regulating means for adjusting all of said variable constrictions together, said control means being effective for causing said variable constrictions to increase in area when said pressure difference rises above a predetermined value and to decrease in area when said pressure difference falls below said predetermined value; and a second control means responsive to variations in the difference of pressure between the constriction in said one stream and said pressure-regulating means for controlling said pressure regulating means by comparing the pressures in said conduits whereby to adjust the regulating valve.

2. A device according to claim 1 wherein the second control means comprises a servomotor operated by the fluid pressure of whichever of the fluid streams has for the time being the higher pressure for operating said pressure-regulating valve including a pressure responsive member for controlling the movements of the servomotor.

3. A device according to claim 1 wherein said pressure-regulating means also includes a pressure-regulating valve in the conduit of said one stream for regulating the fluid pressure on the upstream side of the constriction therein, said second control means comparing the pressures in said conduits upstream of the variable constrictions therein whereby to adjust the regulating valves, said second control means comprising a servomotor common to said two streams including a pressure responsive member responsive to the pressure of the stream having for the time being the higher pressure for opening the valve as it closes the other valve and vice versa.

4. A device according to claim 1 wherein a non-return valve is positioned in each conduit upstream of the variable constriction; said pressure regulating means also includes a pressure-regulating valve in the conduit of said one stream, each regulating valve is interposed between said non-return valve and said variable constriction in each said conduit for regulating the fluid pressure on the upstream side of the variable constriction; said pressure regulating means further includes a common servomotor effective for operating said pressure regulating valves in opposite senses.

5. A device according to claim 4 wherein said servomotor operates the pressure-regulating valves so that failure of one of the streams results in an initial closing movement of the pressure-regulating valve of the other stream followed by re-opening thereof to a predetermined extent.

6. A device according to claim 4 wherein said second control means controls said servomotor in the sense to cause said pressure regulating valves to equalize said pressures by comparing the pressures in said conduits, and a control valve responsive to an abnormal fall of pressure in either of said conduits and operative on failure of the supply of fluid to one of said conduits to open the pressure-regulating valve in the other conduit.

7. A device according to claim 6 wherein said control valve is provided with a spring mechanism for adjusting the pressure-regulating means to re-open the valves thereof, said mechanism being held inoperative by whichever supply stream has the lower pressure upstream of said pressure-regulating means so that on attainment of a predetermined fall of pressure in said lower-pressure stream the spring mechanism is permitted to operate.

8. A device according to claim 6 wherein said pressure regulating means also includes a hydraulic mechanism; said control valve is operative on attainment of a predetermined fall of pressure in whichever supply stream has the lower pressure upstream of said pressure-regulating means to apply the other stream to the hydraulic mechanism for adjusting the pressure-regulating means to re-open the valve of said other stream to a predetermined extent.

9. A device according to claim 8 wherein said servomotor comprises a valve, said hydraulic mechanism comprises a pair of spaced apart pistons, spring means for urging said pistons toward one another, the space between the pistons being subjected to whichever stream has the lower pressure, said pistons being connected with the servomotor valve to centralize said valve when the pistons are brought together by the spring means.

10. A device according to claim 8 wherein said servomotor comprises a valve and said hydraulic mechanism is adapted to centralize the valve of the servomotor.

11. A device as claimed in claim 8 wherein said hydraulic mechanism comprises an assembly of two diaphragms with a space between them so that each diaphragm is subjected always to the downstream pressure in the same direction, the space between the diaphragms being normally subjected to the fluid pressure downstream of the variable constrictions and actuation of the control valve replaces said normal supply by said other stream.

12. A device according to claim 1 wherein said pressure-regulating means also includes a pressure-regulating valve in the conduit of said one stream for regulating the fluid pressure on the upstream side of the constriction therein, said pressure-regulating valves are positioned upstream of said constrictions, a non-return valve is positioned in each conduit upstream of the pressure-regulating valve, and means are provided operative to by-pass any of the conduits from between its pressure-regulating valve and its non-return valve to downstream of its variable constriction on attainment of a predetermined rise of pressure upstream of its pressure regulating valve.

13. A device according to claim 12 wherein said by-pass means becomes operative also on attainment of a predetermined fall of pressure in another of the conduits upstream of its pressure-regulating valve.

14. A device according to claim 1 wherein said pressure regulating means also includes a pressure-regulating valve in the conduit of said one stream for regulating the fluid pressure on the upstream side of the constriction therein, said pressure-regulating valves are positioned upstream of said constrictions, a non-return valve is positioned in each conduit upstream of the pressure-regulating valve, and means are provided operative to by-pass any of the conduits from between its pressure-regulating valve and its non-return valve to downstream of its variable constriction on attainment of a predetermined fall of pressure in another of the conduits upstream of its pressure-regulating valve.

15. A device according to claim 1 wherein said second control means comprises an assembly of two diaphragms with a vented space between them so that each diaphragm is subjected always to the downstream pressure in the same direction.

16. A device according to claim 1 in which the variable constrictions are each constituted by an orifice in a plate-like member associated with a movable shutter for varying the area of the free opening of the orifice.

17. A device as claimed in claim 16 wherein all the said shutters are rigidly connected and operated by the pressure of the fluid being controlled, the shape and dimensions of the orifices being so determined in relation to the movements of the shutters as to maintain the areas of the orifices in the same relation as that required between the fluid streams.

18. A device as claimed in claim 17 in which a common servomotor operates said shutters and utilizes as working medium fluid drawn from upstream of the pressure-regulating means from whichever stream for the time being has the higher pressure, the servomotor being controlled by movements of a member responsive to the difference between the pressure upstream of the orifices and the sum of the pressure downstream of the orifices and another substantially constant pressure.

19. A device according to claim 18 wherein a spring is provided for producing said substantially constant pressure.

References Cited in the file of this patent

UNITED STATES PATENTS

| | | |
|---|---|---|
| 1,153,547 | Finney | Sept. 14, 1915 |
| 1,333,986 | Lundgaard | Mar. 16, 1920 |
| 1,772,920 | Smoot | Aug. 12, 1930 |
| 2,074,882 | Wunsch | Mar. 23, 1937 |
| 2,074,883 | Ziebolz et al. | Mar. 23, 1937 |
| 2,145,114 | Gibbs et al. | Jan. 24, 1939 |
| 2,200,578 | Mahon | May 14, 1940 |
| 2,313,797 | Bailey | Mar. 16, 1943 |
| 2,692,607 | Savage | Oct. 26, 1954 |